(12) United States Patent
Smith et al.

(10) Patent No.: US 8,545,153 B2
(45) Date of Patent: Oct. 1, 2013

(54) FREE SPIN FASTENER ASSEMBLY

(75) Inventors: Mark W. Smith, El Paso, TX (US);
Leon E. Garay, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 1092 days.

(21) Appl. No.: 12/011,885

(22) Filed: Jan. 30, 2008

(65) Prior Publication Data
US 2009/0191021 A1    Jul. 30, 2009

(51) Int. Cl.
*F16B 35/00* (2006.01)
*H01R 35/00* (2006.01)

(52) U.S. Cl.
USPC .......................... 411/107; 411/999; 439/359

(58) Field of Classification Search
USPC ......... 411/411, 423, 554, 999, 107; 439/359, 439/362
See application file for complete search history.

(56) References Cited

U.S. PATENT DOCUMENTS

| | | | | |
|---|---|---|---|---|
| 2,152,231 A * | 3/1939 | Yaneson | | 411/554 |
| 2,279,343 A * | 4/1942 | Reeser | | 411/554 |
| 2,321,378 A * | 6/1943 | Green | | 411/414 |
| 2,321,379 A * | 6/1943 | Green | | 411/423 |
| 2,334,188 A * | 11/1943 | Gazley | | 411/554 |
| 2,353,030 A * | 7/1944 | Green | | 411/423 |
| 3,126,935 A * | 3/1964 | Tuozzo | | 411/352 |
| 3,650,551 A * | 3/1972 | Akers | | 285/143.1 |
| 3,853,381 A * | 12/1974 | Morningstar | | 439/364 |
| 4,403,895 A * | 9/1983 | Caldwell et al. | | 411/378 |
| 4,424,639 A * | 1/1984 | Richardson | | 43/18.1 R |
| 4,601,625 A | 7/1986 | Ernst et al. | | |
| 4,627,759 A * | 12/1986 | Kato et al. | | 403/2 |
| 5,290,132 A * | 3/1994 | Gnage et al. | | 411/512 |
| 5,376,016 A * | 12/1994 | Inaba et al. | | 439/364 |
| 6,126,458 A | 10/2000 | Gregory, II et al. | | |
| 6,443,779 B2 | 9/2002 | Suzuki | | |
| 6,541,700 B2 | 4/2003 | Chiriku et al. | | |
| 6,623,226 B2 * | 9/2003 | Braun et al. | | 411/353 |
| 6,994,502 B2 * | 2/2006 | Winter et al. | | 411/411 |
| 7,144,212 B2 | 12/2006 | Kaye et al. | | |

* cited by examiner

*Primary Examiner* — Flemming Saether
(74) *Attorney, Agent, or Firm* — Robert J. Myers

(57) ABSTRACT

A fastener and a fastener system using the fastener are disclosed. The fastener has an elongated shank having a thread formed at one end and a annular recess formed adjacent the threaded portion to define a leading and trailing abutment surface. The thread guides the fastener into engagement with one or more components having thread engagement features and the annular recess permits the free spinning of the fastener without further tightening after the thread engagement features have advanced past the thread. The fastening system includes the fastener and a component to be fastened having a passageway for accepting the fastener formed by at least two flanges engageable in the thread and engageable in the annular recess of the fastener.

18 Claims, 7 Drawing Sheets

FREE SPIN FASTENER ASSEMBLY

TECHNICAL FIELD

The present disclosure relates to fastener systems, and more particularly to fastener system for securely holding two components together against undesired separation while preventing excessive strain levels within the components.

BACKGROUND

Many components are attached to one another by locks integrally formed in one of the components. Such integrally formed locks keep the number of parts required for assembly low and allow some control of stress levels in the components by dimensional control of the components. However, they do not facilitate separation of the components when servicing is required. When an integrally formed lock is damaged, it requires replacement or rework of the component from which it is formed. Furthermore, if the lock is integrally formed with one of the components being fastened, it must be formed of the same material as that component, which results in a compromise in the choice of material between those having characteristics most appropriate for the function of the component and those most appropriate for the locking feature.

Alternatively, many components have been attached to one another by a fastening pin that extends through apertures in the two components and is headed on one end to abut a surface of one component. The fastening pin is typically threaded into the material of the other component. For some installations, particularly where a threaded fastener is threaded into a plastic component, the components may be damaged if excessive torque is applied. Such fastening assemblies may require specialized tooling, such as sensitive torque limited tightening equipment, for assembly or disassembly of the components for those installations where control of the amount of stress experienced by the components being fastened is critical. Furthermore, systems relying on threaded locking systems may be less reliable than abutment-type locking systems when the components are used in environments where significant vibration is experienced.

For example, in a traditional automotive bussed electrical center connection system, there are a series of male blades used to connect the various wiring harnesses to the vehicle. Since the bussed electrical connection-type harness connection is comprised of plastic components, it is considered a "soft" mechanical joint and the bolt is used as a mechanical assist mechanism and not as a compression force driver. The torque limits for such bussed electrical connection-type harness connections may be in the range of three to six newton-meters (3-6 nm), significantly lower than the torque range of typical other fasteners used in vehicle assembly, thus requiring special tools to prevent damage to the comparatively soft plastic components.

Another approach used in some connections is to use a fastening systems having an elongated headed and threaded pin and threading an additional component, such as a nut, onto the back side of the pin. Still another approach is using and elongated member and deforming it on the back side of the components to be fastened. These approaches may be inconvenient or impossible for many installations, such as the bussed electrical connection-type harness connection described above, because they require access to the backside of the fastened assembly, which may be unavailable or difficult to access. They also still may require torque limiting equipment to avoid excessive stress levels.

In light of the foregoing, a need has arisen for a fastener system that is easy to assemble without specialized tooling, facilitates low cost servicing of the components being fastened, minimizes stresses experienced by the components, and provides for a secure assembly of the components in an environment susceptible to vibration.

BRIEF SUMMARY

A fastener system includes a shank having a leading portion and a trailing portion, wherein a threaded portion formed on the leading portion defines a first outer diameter. An annular recess is formed between the threaded portion and the trailing portion of the shank defining a second outer diameter smaller than the first outer diameter. A leading abutment is formed at the leading end of the annular recess, the threaded portion of the fastener shank terminating at the leading abutment, and a trailing abutment formed on the trailing end of the annular recess.

BRIEF DESCRIPTION OF THE DRAWINGS

Embodiments of the present invention will now be described by way of example in greater detail with reference to the attached figures, in which.

DETAILED DESCRIPTION

Figure 1:
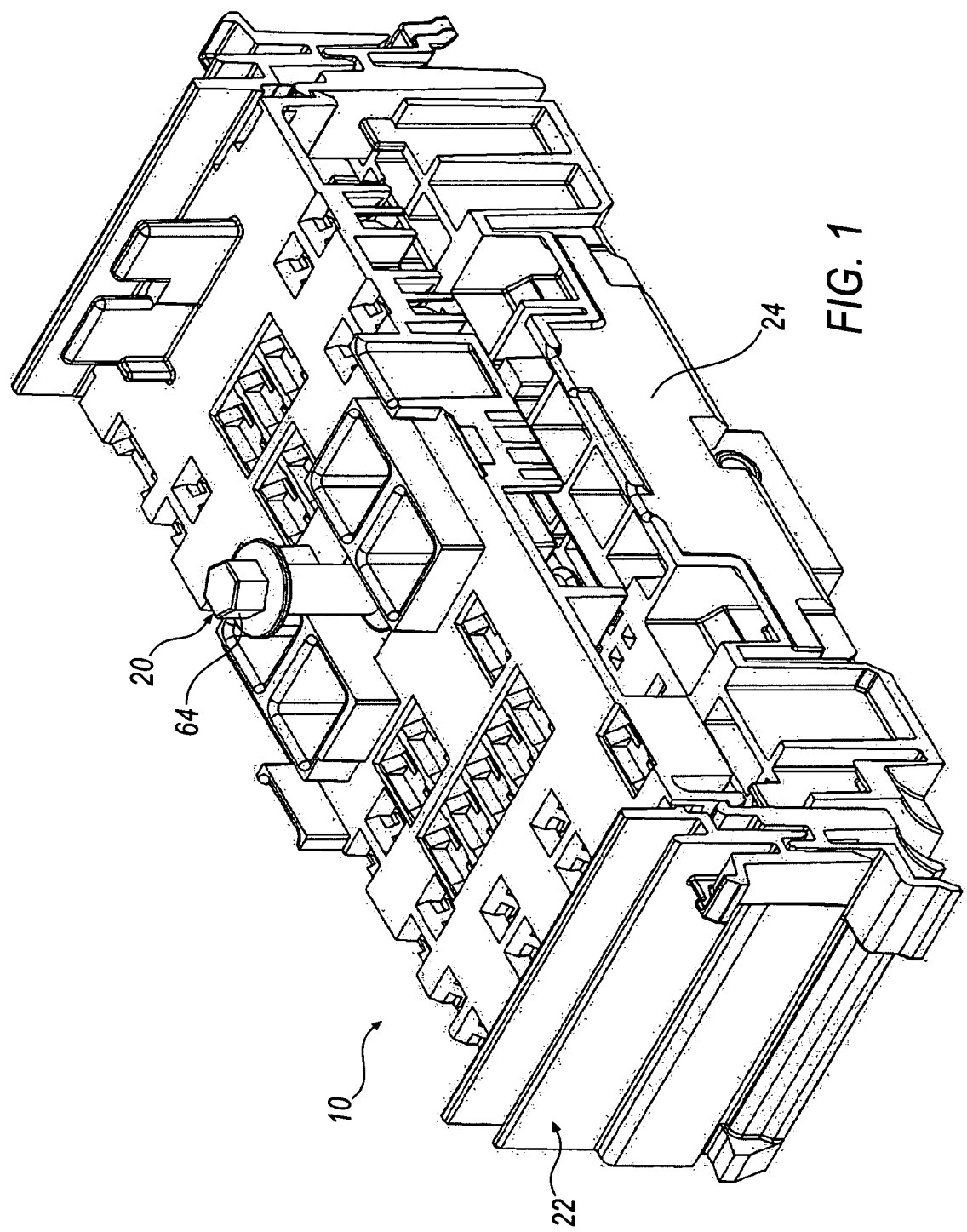
FIG. 1 is a perspective view of an exemplary assembly of components using the fastener and fastening system.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present invention. Further, the descriptions set forth herein are not intended to be exhaustive or otherwise limit or restrict the claims to the precise forms and configurations shown in the drawings and disclosed in the following detailed description. The present disclosure provides a fastener and a fastening system that facilitates providing a reliable and durable assembly while minimizing the stress experienced by the components being fastened. As will be described in greater detail below, while the fastener and fastening system are illustrated in the exemplary embodiment in the drawing as a system for fastening components of a wiring harness, the fastener and fastening system may be used for a wide variety of fastening applications.

Figure 2:
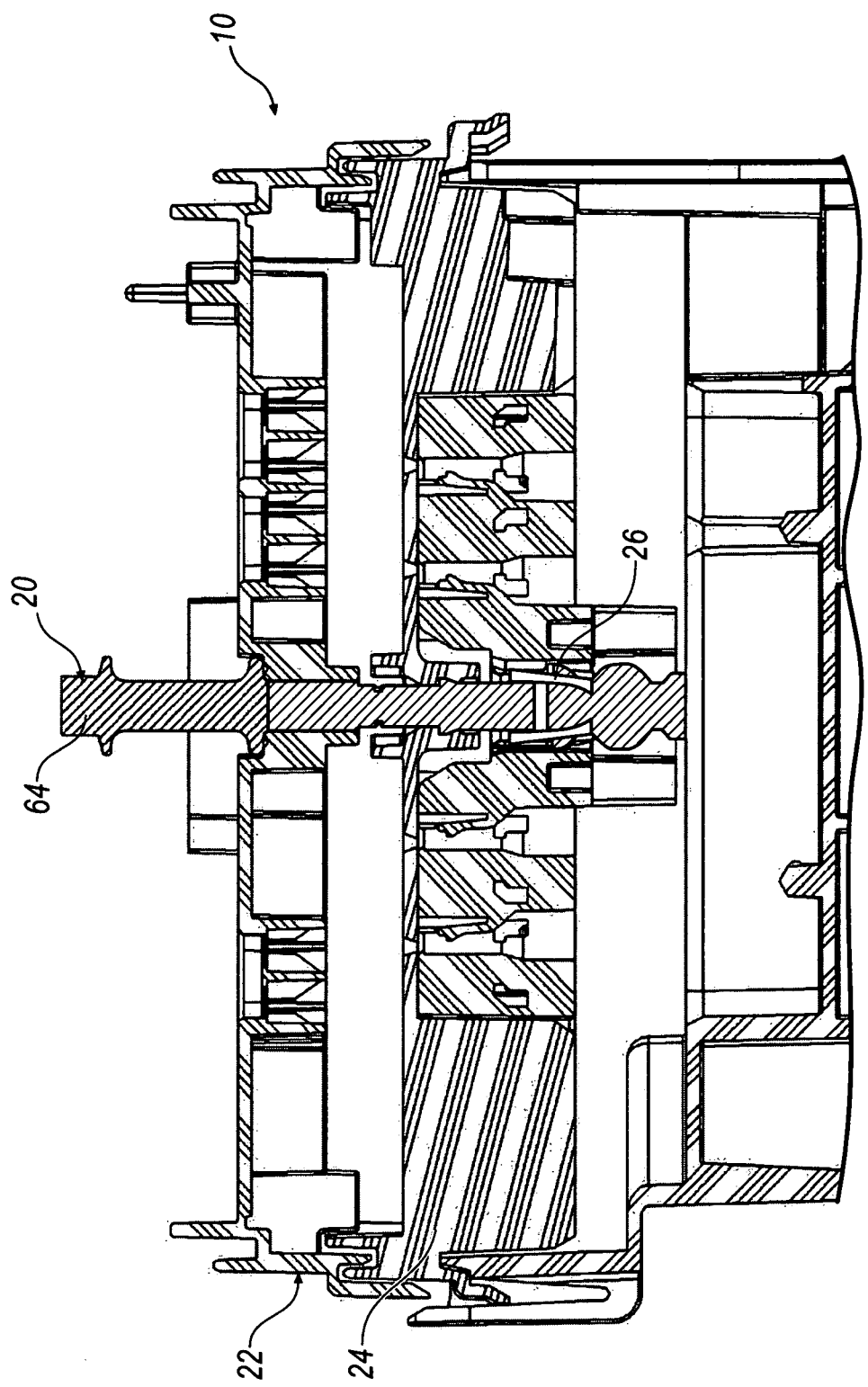
FIG. 2 is a sectional view through the assembly of components of FIG. 1 illustrating some features of the fastener and the fastening system.

There are many applications requiring a fastening assembly 10 (FIGS. 1, 2 and 10) for holding two or more components together in a reliable manner without subjecting the components to excessive stress. For exemplary purposes, the fastener assembly 10 illustrated in FIGS. 1 and 2, has a bolt or fastener 20 used for holding together an upper component 22 and a lower component 24 of a vehicular bussed electrical center assembly. A female fastening component 26 (FIG. 2) for engaging the fastener 20 is incorporated into the lower component 24 of the electrical center assembly in the example illustrated.

Figure 3:
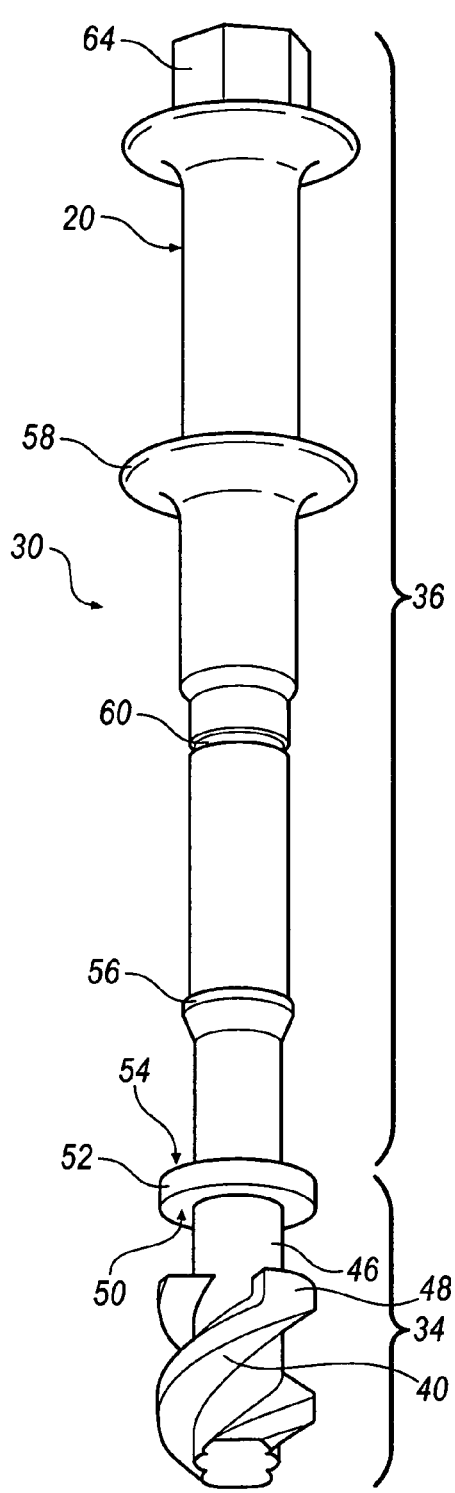
FIG. 3 is a perspective view of the exemplary fastener used in the assembly of components of FIGS. 1 and 2.
Figure 4:
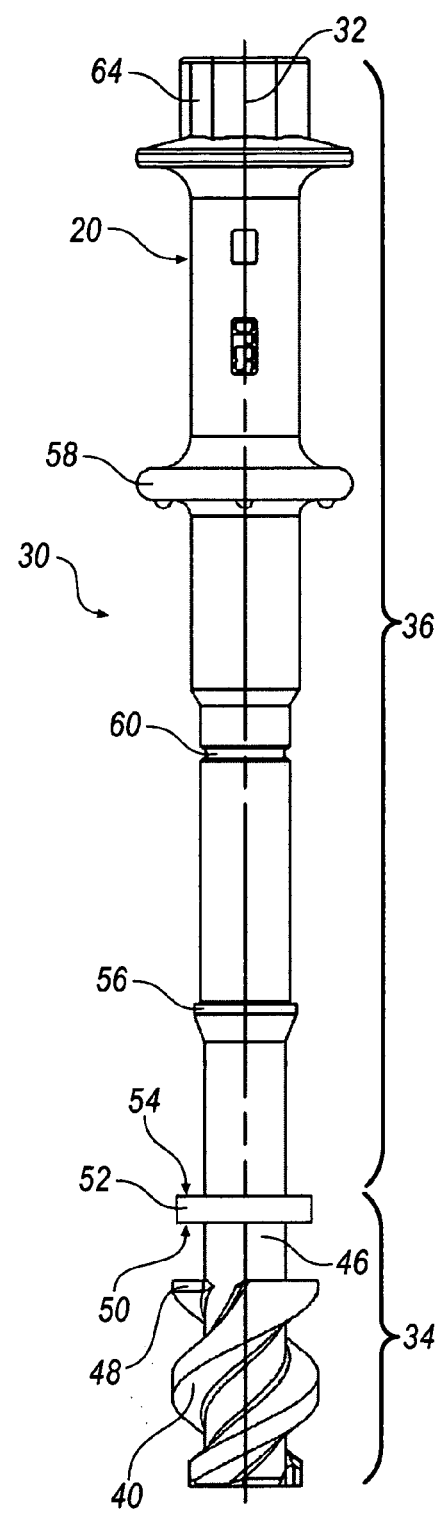
FIG. 4 is an elevational view of the fastener of FIG. 3.
Figure 5:
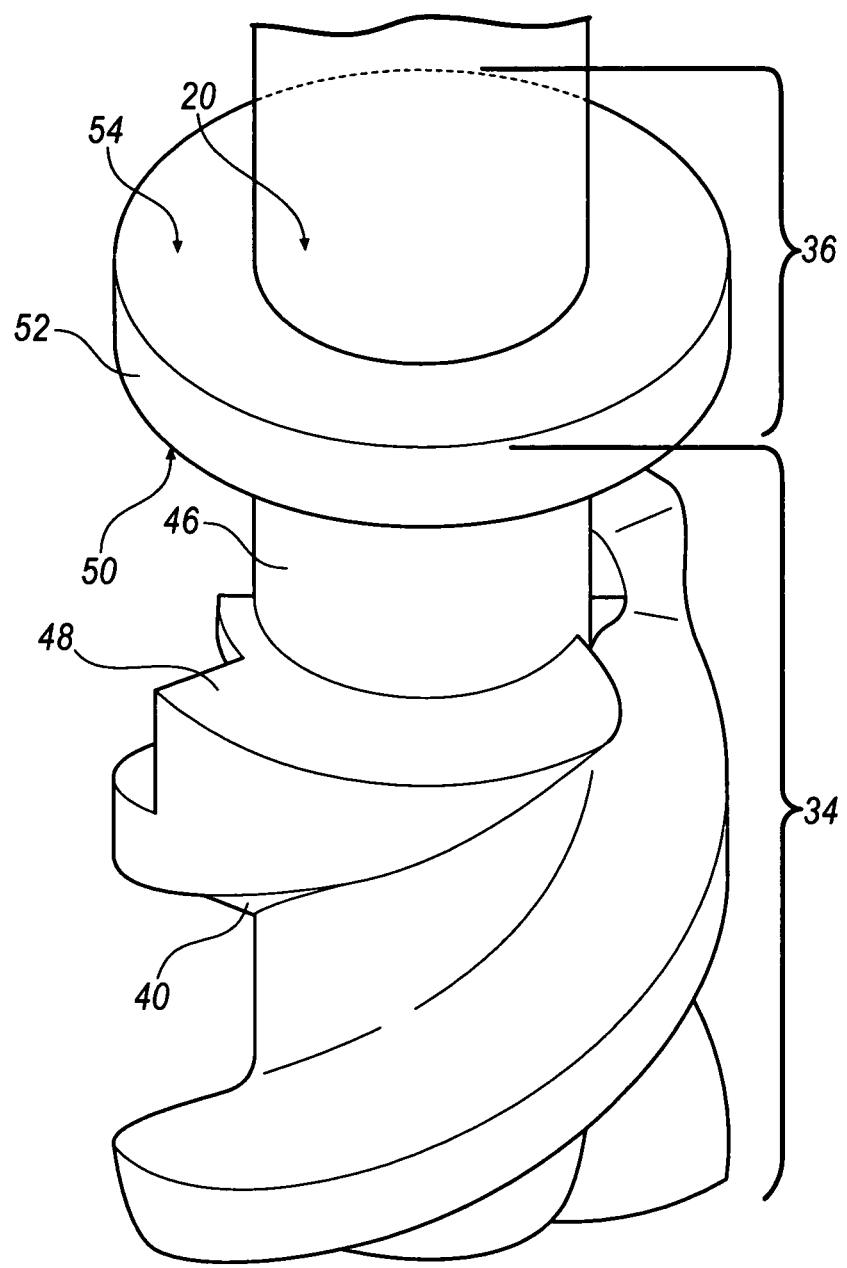
FIG. 5 is an enlarged perspective view of the leading portion of the fastener of FIGS. 3 and 4.

Refer now to FIGS. 3-5 illustrating details of the fastener 20. The fastener 20 has an elongated shank 30 defining a longitudinal axis 32 (FIG. 4), a leading portion 34 and a trailing portion 36. The leading portion 34 is provided with a thread 40 (a threaded portion) for engagement with the female fastening component 26 (FIGS. 2 and 6-10) in a manner described later herein in detail. The thread 40 is designed so as to have a valley and pitch proportioned to accept a thread engagement structure, described later, of the female fastening component 26, also described in detail later. In the example illustrated, the thread 40 is a large three-quarter (¾) turn thread.

The fastener 20 is further provided with an annular recess 46 formed adjacent to the thread 40 in the trailing portion 36 of the elongated shank 30. The annular recess 46 has an outer diameter less than the outer diameter of the thread 40. In the example illustrated, the annular recess 46 further has an outer diameter approximately equal to the inner diameter of the thread 40. The annular recess 46 defines a leading annular abutment surface 48 where threads 40 terminate as well as a trailing annular abutment surface 50 opposite the leading annular abutment surface 48. The outer diameter and the longitudinal length of the annular recess 46 between surfaces 48 and 50 are also proportioned to accept at least one inwardly extending lip, described later, of the female fastening component 26.

The elongated shank 30 has an intermediate annular enlarged portion or intermediate head 52 having a reduced diameter trailing portion 54 extending longitudinally in the trailing direction from the annular recess 46. The intermediate head 52 has an outer diameter greater than the inner diameter of the thread 40 and is proportioned to engage the walls of a passageway in the female fastening component 26.

The elongated shank 30 may be provided with other engagement features such as enlarged annular portions, annular recess 46, and other features for providing specialized functions like engagement, connection, and abutment as required by the specific components being fastened together by the fastener 20. In the example illustrated, as shown in FIGS. 3 and 4, the elongated shank 30 of the fastener 20 may be provided with enlarged annular portions 56 and 58 and annular recess 46 for cooperation or engagement with features of the upper component 22 or lower component 24 (FIG. 2) of the assembly of components being joined by the fastener 20.

As shown in FIGS. 1-4, the fastener 20 is provided with a head 64 at its trailing end portion 36. The head may provide an abutment surface for engagement with one of the components being joined by the fastener 20. The head 64 may also provide a tool engagement feature, such as a male or female tool engagement feature for accepting a screw driver, wrench or other fastener installation tool, not illustrated.

Figure 6:
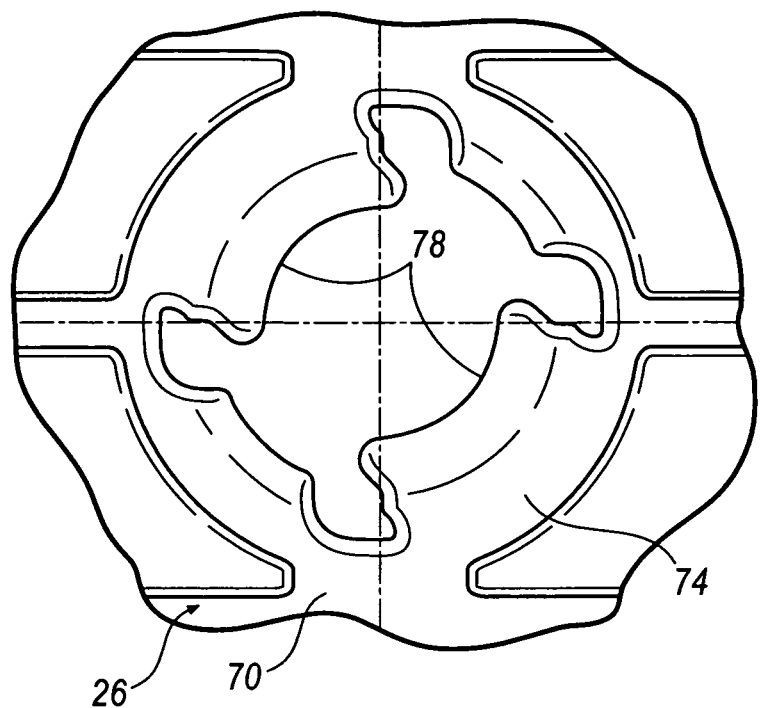
FIG. 6 is a top plan view of a female fastening component for use in association with the fastener of FIGS. 3-5.
Figure 7:
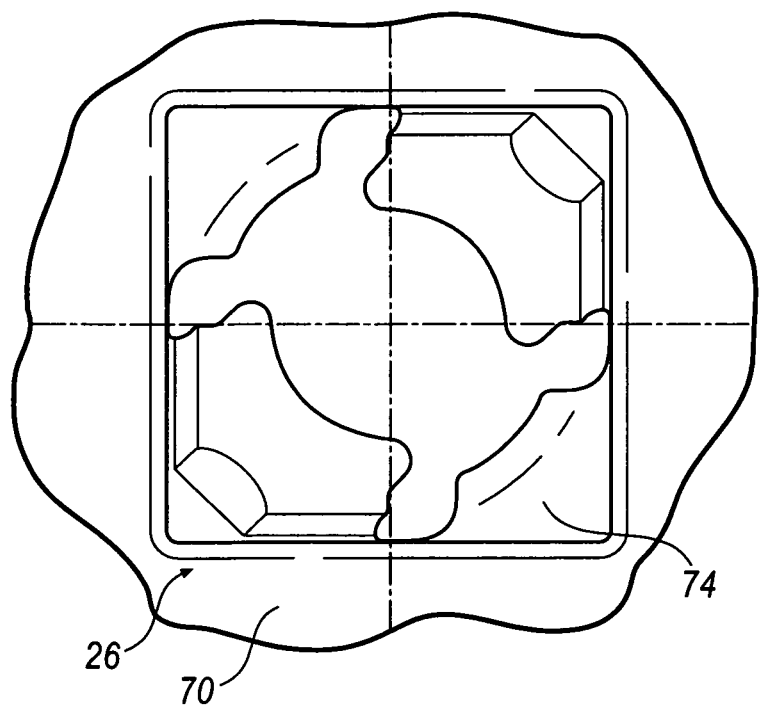
FIG. 7 is a bottom plan view of the female fastening component of FIG. 6.
Figure 8:
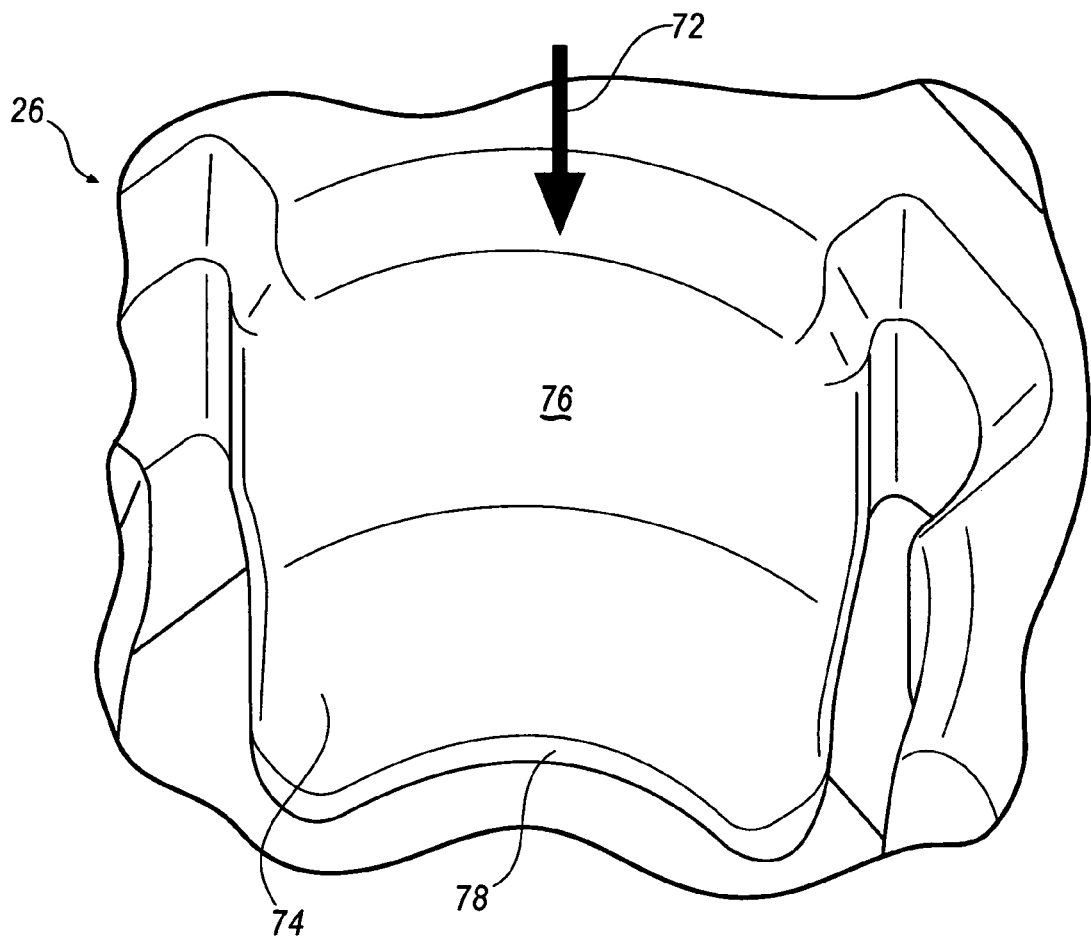
FIG. 8 is a perspective view of one passageway segment of the female fastening component of FIGS. 6 and 7.
Figure 9:
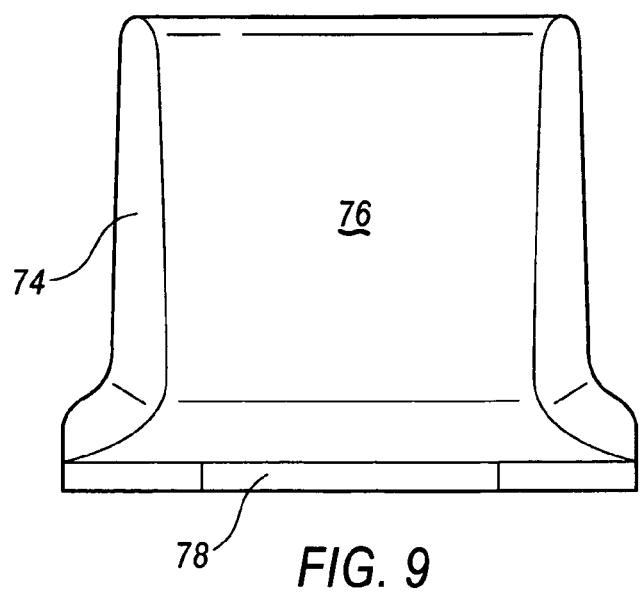
FIG. 9 is an elevational view of the passageway segment of FIG. 8.

FIGS. 6-9 illustrate details of an exemplary female fastening component 26. As best shown in FIGS. 6 and 7, the female fastening component 26 includes a main body 70 having a plurality of downwardly extending flanges or passageway segments 72 (FIGS. 8 and 10) that cooperate to form an elongated passageway 74 through the female fastening component 26 for the fastener 20. As best shown in FIGS. 8 and 9, each passageway segment 72 has an arcuate surface 76 that cooperates with one or more other passageway segments 72 to define a circular cross section for the elongated passageway 74. The arcuate surface 76 is also curved longitudinally to define a gradually reducing inner diameter for the elongated passageway 74. An inwardly extending lip 78 is formed at the leading edge of each passageway segment 72. Each inwardly extending lip 78 provides a thread engagement structure for engagement with the thread 40 and the annular recess 46 (FIGS. 2, 3, 4 and 10) of the fastener 20.

Figure 10:
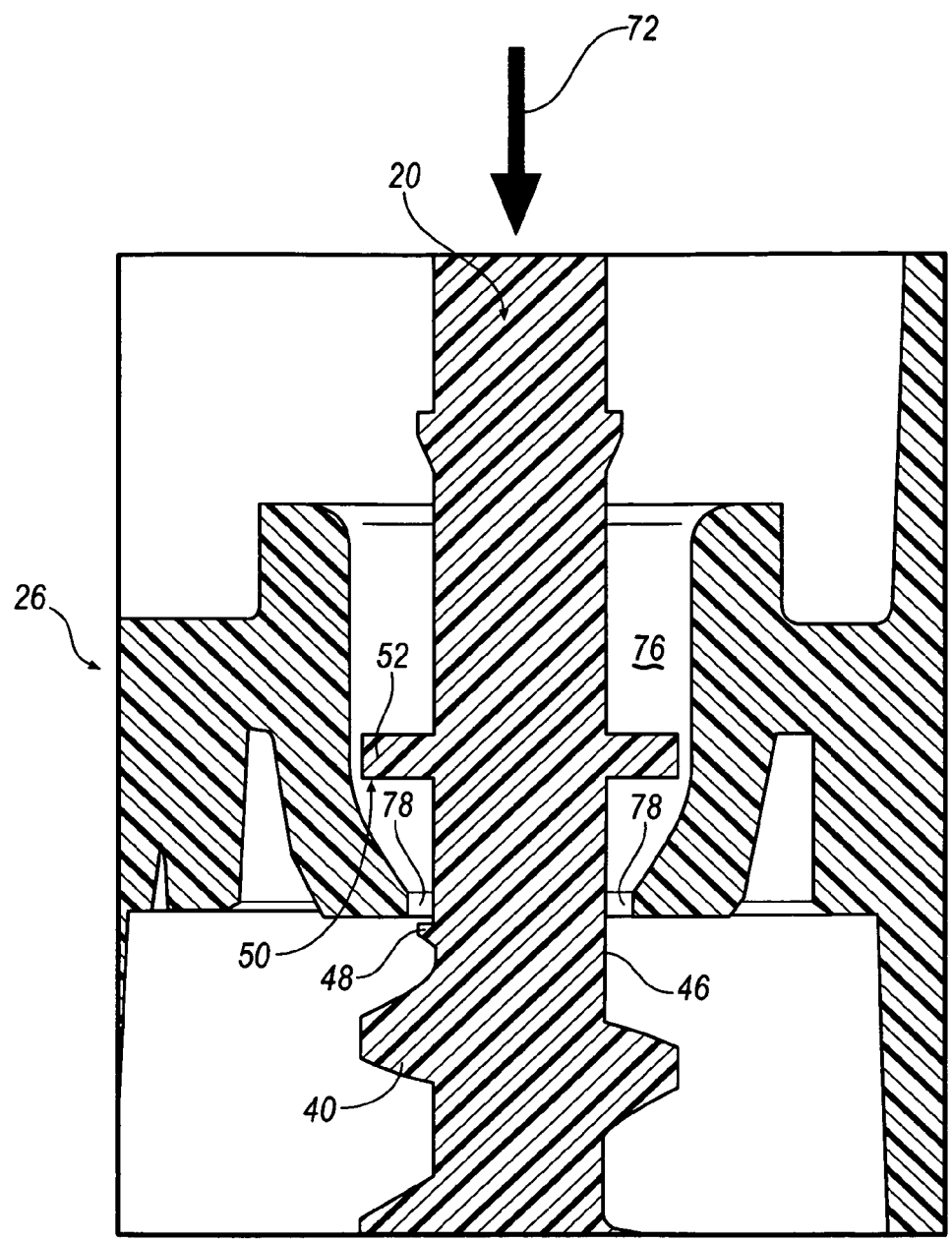
FIG. 10 is an enlarged cross-sectional partial view of the fastener assembly showing the fastener of FIGS. 3-5 engaged with the female fastener component of FIGS. 6-9.

Refer now to FIG. 10 illustrating the fastener 20 engaged with the female fastening component 26. For installation, the leading end of the fastener 20 is inserted into the elongated passageway 74 until the thread 40 encounters the inwardly extending lips 78 of the passageway segments 72 of the female fastening component 26. The fastener 20 is rotated to advance the thread 40 past the inwardly extending lips 78, which may be facilitated by a small deflection of the passageway segments 72. As the fastener 20 is advanced along the elongated passageway 74, the intermediate head 52 advances adjacent the inwardly sloping arcuate surface 76 and engages the arcuate surface. The arcuate surface 76 exerts an increasing force on the intermediate head 52 resisting the continued advancement of the fastener 20 along the elongated passageway 74. The fastener is rotated to pull the assembly together until the thread 40 passes the inwardly extending lips 78 and the lips enter the annular recess 46 in the elongated shank 30 of the fastener 20.

Once the thread 40 of the fastener 20 has passed the inwardly extending lips 78 and the lips have fully entered the annular recess 46, the fastener 20 may spin freely without further tightening of the assembly. At this point, the leading annular abutment surface 48 of the elongated shank 30 engages the inwardly extending lips 78. In this way, the bolt or fastener 20 can spin freely after assembly regardless of any applied torque.

In the illustrated embodiment, when the lips have fully entered the annular recess 46, the arcuate surfaces 76 of the passageway segments 72 exert sufficient force on the intermediate head 52 to bias the inwardly extending lips 78 in a fixed position against the leading annular abutment surface 48 of the elongated shank 30. The leading annular abutment surface 48 inhibits the inwardly extending lips 78 from reentering the thread 40, thereby inhibiting the undesired uncoupling of the components if the fastener is rotated in the direction opposite the tightening direction.

In the example illustrated, the female fastening component 26 is formed of a plastic material and the passageway segments 72 have a predetermined flexibility designed to facilitate the passage of the fastener 20 along the elongated passageway 74 during a fastening operation, while having sufficient stiffness to prevent the unintentional disengagement of the inwardly extending lip 78 from the annular recess 46 after assembly is complete.

An additional advantage of the inherent torque limiting characteristic of the fastener system described above is that components of the assembly do not need to be designed to withstand the higher level of torque or compression which they might unintentionally experience with prior designs, regardless of the potential torque output of the tightening equipment used. For example, the fastener 20 used for a vehicle bussed electrical connection can be made from an inexpensive die cast zinc alloy using a die cast manufacturing process without requiring the use of a special torque limiting tool. By eliminating the excessive torque or stress associated with traditional connection systems, the fastener becomes compatible with commonized tools.

It will be appreciated that while the fastener system has been described using an exemplary bussed electrical service assembly; the fastener system described herein has broad applications for fastening a variety of components. The foregoing embodiments were chosen and described in order to illustrate principles of the methods and apparatuses as well as some practical applications. The preceding description enables others skilled in the art to utilize methods and apparatuses in various embodiments and with various modifications as are suited to the particular use contemplated. In accordance with the provisions of the patent statutes, the principles and modes of operation of this invention have been explained and illustrated in exemplary embodiments.

It is intended that the scope of the present methods and apparatuses be defined by the following claims. However, it must be understood that this invention may be practiced otherwise than is specifically explained and illustrated without departing from its spirit or scope. It should be understood by those skilled in the art that various alternatives to the embodiments described herein may be employed in practicing the claims without departing from the spirit and scope as defined in the following claims. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. Furthermore, all terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary. It is intended that the following claims define the scope of the invention and that the method and apparatus within the scope of these claims and their equivalents be covered thereby. In sum, it should be understood that the invention is capable of modification and variation and is limited only by the following claims.

What is claimed is:

1. A fastener assembly comprising:
a female fastening component having a main body and an elongated passageway having an inner wall extending into at least one inwardly extending lip, a portion of the passageway having a gradually decreasing inner diameter along a portion of a length of the female fastening component that transitions to the at least one inwardly extending lip; and
a male fastener component including,
an elongated shank disposed along a longitudinal axis including,
a leading portion including a threaded portion having threads and configured to axially receive the female fastening component, and
a trailing portion opposite the leading portion, the threaded portion being engageable with the inwardly extending lip of the female fastening component such that the male fastener component is capable of being advanced in the leading direction relative to the female fastening component along the axis by rotating the shank, said leading portion further including an annular recess disposed between the threaded portion and a trailing portion of the shank and engageable with the inwardly extending lip after the threads are advanced along the axis past an end of the threads, said leading portion further including an annular head formed on the shank trailing the annular recess, the annular head configured to engage the inner wall of the female fastening component when the inwardly extending lip is disposed in the annular recess of the shank, wherein when the leading portion of the shank extends axially through the portion of the passageway and past the at least one extending lip of the female fastening component until the inwardly extending lip is disposed freely within the annular recess, so that at least the shank of the fastener assembly rotates freely about the axis.

2. The fastener assembly of claim 1, wherein the elongated passageway is formed by a plurality of elongated passageway segments, said plurality of elongated passageway segments adapted for deflection to assist advancement of the threads past the inwardly extending lip.

3. The fastener assembly of claim 2, wherein the elongated passageway segments are flexible.

4. The fastener assembly of claim 1, wherein the shank further comprises an annular abutment formed at the leading end of the annular recess having a leading abutment surface wherein the threads terminate at the leading abutment surface, the leading abutment surface being engageable with the inwardly extending lip of the female fastening component to inhibit axial movement of the shank when the inwardly extending lip is disposed within the annular recess and inhibit re-entry of the inwardly extending lip onto the threads thereby permitting the fastening assembly to freely spin about the axis without a loosening of a connection between the male and the female fastening component.

5. The fastener assembly of claim 1, wherein the elongated passageway further comprises an inwardly oriented sloping surface adjacent the inwardly extending lip for engagement with the annular head of the male fastener component.

6. The fastener assembly of claim 1, wherein the shank further comprises the trailing portion extending away from the annular head, said trailing portion including at least one enlarged annular portion and two or more components held by the fastening assembly engage the fastening assembly between the at least one enlarged annular portion and the female fastening component.

7. The fastener assembly of claim 1, wherein the trailing portion includes a head at an end of the trailing portion.

8. The fastener assembly of claim 7, wherein the head at the end of the trailing portion includes a tool engagement feature to engage a tool to facilitate rotation of the shank.

9. The fastener assembly of claim 1, wherein the threads of the threaded portion comprise a generally rectangular shape.

10. A fastener assembly comprising:
an elongated shank disposed along a longitudinal axis including,
a trailing portion, and
a leading portion opposite the trailing portion including a threaded portion having threads and defining an annular recess disposed intermediate the threaded portion and the trailing portion; and a female fastening component including an elongated passageway defining at least one inwardly extending lip adapted to be axially received by said leading portion, a portion of the passageway having a gradually decreasing inner diameter along a portion of an axial length of the female fastening component that transitions to the at least one inwardly extending lip, wherein the leading portion of the shank extends axially through the portion of the passageway and past the at least one inwardly extending lip until the at least one inwardly extending lip is disposed freely within the annular recess, so that at least the shank of the fastener assembly rotates freely about the axis
wherein an annular head on the shank has a first diameter and said lip has a second diameter, and said first diameter of the annular head is greater than said second diameter of the lip so that when the female fastening component is fastened to the shank the annular head of the shank engages at least one arcuate surface in the passageway at least until the lip enters the annular recess of the shank.

11. The fastener assembly of claim 10, wherein the trailing portion of the shank includes a head.

12. The fastener assembly of claim 11, wherein the head is configured to have a tool engagement feature to engage a tool to facilitate rotation of the shank.

13. The fastener assembly of claim 12, wherein the tool to engage the tool engagement feature is one of,
 (i) a screwdriver, and
 (ii) a wrench.

14. The fastener assembly of claim 10, wherein the trailing portion of the shank has at least one enlarged annular portion adapted to engage a surface of a component being fastened by the fastener assembly.

15. The fastener assembly of claim 10, wherein the threads of the threaded portion have a generally rectangular shape.

16. The fastener assembly of claim 10, wherein the threaded portion comprises a three-quarter turn thread.

17. The fastener assembly of claim 10, wherein when said lip is disposed freely in the annular recess, the lip is disposed between a leading abutment surface on said threaded portion and an annular head of the shank, and the elongated passageway of the female fastening component encloses the annular head of the shank.

18. The fastener assembly of claim 10, wherein the fastener assembly is a primary fastener assembly holding together at least an upper component to a lower component in a bussed electrical center, and the female fastening component is disposed within one of said components.

* * * * *